US009258380B2

(12) United States Patent
Ma

(10) Patent No.: US 9,258,380 B2
(45) Date of Patent: Feb. 9, 2016

(54) CROSS-PLATFORM MULTIMEDIA INTERACTION SYSTEM WITH MULTIPLE DISPLAYS AND DYNAMICALLY-CONFIGURED HIERARCHICAL SERVERS AND RELATED METHOD, ELECTRONIC DEVICE AND COMPUTER PROGRAM PRODUCT

(71) Applicant: Realtek Semiconductor Corp., Hsinchu (TW)

(72) Inventor: Chen Ma, San Jose, CA (US)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 555 days.

(21) Appl. No.: 13/627,676

(22) Filed: Sep. 26, 2012

(65) Prior Publication Data

US 2013/0232223 A1 Sep. 5, 2013

Related U.S. Application Data

(60) Provisional application No. 61/605,771, filed on Mar. 2, 2012.

(30) Foreign Application Priority Data

Aug. 24, 2012 (TW) .............................. 101130868 A

(51) Int. Cl.
*G06F 15/16* (2006.01)
*H04L 29/08* (2006.01)

(52) U.S. Cl.
CPC ............ *H04L 67/2814* (2013.01); *H04L 67/10* (2013.01); *H04L 67/148* (2013.01); *H04L 67/289* (2013.01)

(58) Field of Classification Search
CPC combination set(s) only.
See application file for complete search history.

(56) References Cited

U.S. PATENT DOCUMENTS

| 6,809,724 | B1 | 10/2004 | Shiraishi et al. |
| 7,667,646 | B2 | 2/2010 | Kalliola et al. |
| 8,147,336 | B2 * | 4/2012 | Hirota ..................... A63F 13/12 463/42 |
| 8,849,945 | B1 | 9/2014 | Desjardins et al. |
| 2003/0093491 | A1 * | 5/2003 | Valjakka ............. H04L 67/1008 709/214 |
| 2005/0125716 | A1 | 6/2005 | Cragun et al. |
| 2006/0152487 | A1 | 7/2006 | Grunnet-Jepsen et al. |

(Continued)

FOREIGN PATENT DOCUMENTS

| CN | 1355495 A | 6/2002 |
| CN | 101410878 A | 4/2009 |

(Continued)

*Primary Examiner* — Saket K Daftuar
(74) *Attorney, Agent, or Firm* — Birch, Stewart, Kolasch & Birch, LLP

(57) ABSTRACT

A cross-platform multimedia interaction system with dynamically-configured hierarchical servers is disclosed, including: a central relay server (CRS); multiple electronic devices; and multiple displays respectively arranged in the multiple electronic devices. The CRS dynamically assigns one of the multiple electronic devices as a local relay server (LRS) and instructs the LRS to active a websocket server, and the CRS notifies the other electronic devices of a network address of the LRS. When the LRS actives the websocket server, other electronic devices establish one or more network sockets with the LRS. The multiple electronic devices communicate control parameters via the websocket server, generate corresponding images according to received control parameters, and respectively display the resulting images on the multiple displays.

25 Claims, 6 Drawing Sheets

(56) References Cited

U.S. PATENT DOCUMENTS

| | | | |
|---|---|---|---|
| 2007/0061465 A1* | 3/2007 | Kim | H04L 29/12066 709/226 |
| 2007/0226606 A1 | 9/2007 | Noyes et al. | |
| 2007/0265091 A1 | 11/2007 | Aguilar, Jr. et al. | |
| 2008/0126939 A1 | 5/2008 | Chung et al. | |
| 2008/0136796 A1 | 6/2008 | Dowling | |
| 2008/0209021 A1* | 8/2008 | Shamma | H04L 65/4015 709/223 |
| 2009/0297118 A1 | 12/2009 | Fink et al. | |
| 2010/0010961 A1* | 1/2010 | Golwalkar | G06F 17/30091 |
| 2010/0138746 A1 | 6/2010 | Zarom | |
| 2010/0150404 A1 | 6/2010 | Marks et al. | |
| 2011/0161856 A1 | 6/2011 | Nurmi et al. | |
| 2011/0219420 A1 | 9/2011 | Raveendran et al. | |
| 2011/0251992 A1* | 10/2011 | Bethlehem | H04L 12/2863 707/610 |
| 2012/0011550 A1 | 1/2012 | Holland | |
| 2012/0159329 A1 | 6/2012 | Chow et al. | |
| 2012/0216153 A1 | 8/2012 | Sip | |
| 2012/0272149 A1 | 10/2012 | Lee et al. | |
| 2013/0007724 A1* | 1/2013 | Lai | G06F 8/665 717/173 |
| 2013/0053190 A1 | 2/2013 | Mettler | |
| 2013/0067085 A1* | 3/2013 | Hershko | H04L 61/157 709/225 |
| 2013/0169546 A1 | 7/2013 | Thomas et al. | |
| 2013/0222266 A1 | 8/2013 | Gärdenfors et al. | |

FOREIGN PATENT DOCUMENTS

| | | |
|---|---|---|
| CN | 101579575 A | 11/2009 |
| CN | 101931479 A | 12/2010 |
| WO | WO 2009/074762 A1 | 6/2009 |
| WO | WO 2010/130992 A1 | 11/2010 |
| WO | WO 2012/016497 A1 | 2/2012 |

* cited by examiner

CROSS-PLATFORM MULTIMEDIA INTERACTION SYSTEM WITH MULTIPLE DISPLAYS AND DYNAMICALLY-CONFIGURED HIERARCHICAL SERVERS AND RELATED METHOD, ELECTRONIC DEVICE AND COMPUTER PROGRAM PRODUCT

CROSS-REFERENCE TO RELATED APPLICATIONS

This application claims the benefit of priority to U.S. Provisional Application Ser. No. 61/605,771, filed on Mar. 2, 2012; the entirety of which is incorporated herein by reference for all purposes.

This application also claims the benefit of priority to Taiwanese Patent Application No. 101130868, filed on Aug. 24, 2012; the entirety of which is incorporated herein by reference for all purposes.

BACKGROUND

The present disclosure generally relates to a cross-platform multimedia interaction system and, more particularly, to a cross-platform multimedia interaction system with multiple displays and dynamically-configured hierarchical servers and related method, electronic device and computer program product.

As the technology progresses, more and more electronic devices are capable of connecting to the internet. For example, many desktop computers, desktop game machines, business machines, most mobile electronic devices (such as mobile phones, tablet computers, notebook computers, or hand-held game machines), and even some home appliances (such as televisions, refrigerators, and audio playback systems) are able to be connected to the Internet. Above electronic devices may connect to the internet via wired or wireless communication mechanism. Different electronic devices may communicate data with each other by using additional communication circuits, such as Bluetooth devices, infrared devices, near field communication (NFC) devices, or the like. In addition, each of the above electronic devices is equipped with a display for allowing the user to input control commands or presenting multimedia contents to the user.

However, if different users of different electronic devices want to conduct interaction operations regarding multimedia contents, such as playing interaction games with multiple players or chatting online with multiple users, then those different electronic devices should be provided with extra communication circuits using the same communication protocol so that multimedia contents can be communicated between those electronic devices. Such solution is apparently not realistic because extra communication circuits, such as the above Bluetooth devices, infrared devices, or NFC devices, not only increase the hardware cost of the electronic device, but also increase the entire volume and size of each electronic device.

Nowadays, the design trend in many electronic devices (such as mobile phones and tablet computers) is toward reducing their weight and thickness. It is thus difficult to install various communication circuits of different communication protocols into the limited space inside a single electronic device. Due to the above hardware restriction, it is very difficult to achieve cross-platform interaction operations regarding multimedia contents among different electronic devices.

SUMMARY

An example embodiment of a cross-platform multimedia interaction system with dynamically-configured hierarchical servers is disclosed comprising: a central relay server (CRS); a plurality of electronic devices for communicating with the CRS to conduct an identity authentication; and a plurality of displays respectively arranged on the plurality of electronic devices; wherein the CRS dynamically assigns one of the plurality of electronic devices as a local relay server (LRS) and instructs the LRS to activate a websocket server module, and the CRS notifies the other electronic devices of a network address of the LRS. After the LRS activated the websocket server module, other electronic devices of the plurality of electronic devices establish one or more network sockets with the LRS, and the plurality of electronic devices communicate control parameters via the websocket server module, generate corresponding images according to received control parameters, and respectively display the resulting images on the plurality of displays.

An example embodiment of a multimedia generating method for use in a cross-platform multimedia interaction system is disclosed. The cross-platform multimedia interaction system comprises a CRS, a plurality of electronic devices, and a plurality of displays respectively arranged on the plurality of electronic devices. The method comprises: communicating the plurality of electronic devices with the CRS via internet; utilizing the CRS to conduct an identity authentication on the plurality of electronic devices; dynamically assigning one of the plurality of electronic devices as a LRS; instructing the LRS to activate a websocket server module; utilizing the CRS to notify the other electronic devices of a network address of the LRS; after the LRS activated the websocket server module, establishing one or more network sockets between other electronic devices of the plurality of electronic devices and the LRS; utilizing the plurality of electronic devices to communicate control parameters via the websocket server module; utilizing the plurality of electronic devices to generate corresponding images according to received control parameters; and respectively displaying the resulting images on the plurality of displays.

An example embodiment of a multimedia generating method for use in a target electronic device is disclosed comprising: communicating the target electronic device with a CRS via internet to conduct an identity authentication; receiving an activation command from the CRS via internet; after receiving the activation command, activating a websocket server module in the target electronic device to establish one or more network sockets between the target electronic device and other electronic devices, so that the target electronic device and other electronic devices communicate control parameters via the websocket server module; generating one or more corresponding images according to control parameters received from other electronic devices; and displaying the one or more images on a display of the target electronic device.

An example embodiment of a computer program product, stored in a non-transitory storage device of a target electronic device, when executed by a control circuit of the target electronic device, enabling the target electronic device to conduct a multimedia generating operation is disclosed. The multimedia generating operation comprises: communicating the target electronic device with a CRS via internet to conduct an identity authentication; receiving an activation command from the CRS via internet; after receiving the activation command, activating a websocket server module in the target electronic device to establish one or more network sockets between the target electronic device and other electronic devices, so that the target electronic device and other electronic devices communicate control parameters via the websocket server module; generating one or more corresponding images according to control parameters received from other electronic devices; and displaying the one or more images on a display of the target electronic device.

An example embodiment of a method for selecting a LRS in a cross-platform multimedia interaction system is disclosed. The cross-platform multimedia interaction system comprises a CRS, a plurality of electronic devices, and a plurality of displays respectively arranged on the plurality of electronic devices. The method comprises: utilizing the CRS to conduct an identity authentication on the plurality of electronic devices; dynamically assigning one of the plurality of electronic devices as a current LRS according to respective performance indicators of the plurality of electronic devices; utilizing the CRS to transmit a first activation command to the current LRS to activate a first websocket server module in the current LRS; and utilizing the CRS to notify other electronic devices of the plurality of electronic devices of a first web address of the current LRS, and instructing the plurality of electronic devices to communicate control parameters via the first websocket server module; wherein performance indicators of each of the plurality of electronic devices comprise at least one of the following messages: a processor computing power of the electronic device; a total memory capacity of the electronic device; a remaining memory capacity of the electronic device; a remaining battery level of the electronic device; a count of neighboring electronic devices located within a same predetermined network section as the electronic device; and a next hop count of the electronic device.

An example embodiment of a method for dynamically changing a LRS in a cross-platform multimedia interaction system is disclosed. The cross-platform multimedia interaction system comprises a CRS, a plurality of electronic devices, and a plurality of displays respectively arranged on the plurality of electronic devices. The method comprises: utilizing the CRS to conduct an identity authentication on the plurality of electronic devices; dynamically assigning one of the plurality of electronic devices as a current LRS; utilizing the CRS to transmit a first activation command to the current LRS to activate a first websocket server module in the current LRS; utilizing the CRS to notify other electronic devices of the plurality of electronic devices of a first web address of the current LRS, and instructing the plurality of electronic devices to communicate control parameters via the first websocket server module; selecting another one of the plurality of electronic devices as a new LRS; utilizing the CRS to transmit a second activation command to the new LRS to activate a second websocket server module in the current LRS; and utilizing the CRS to notify other electronic devices of the plurality of electronic devices of a second web address of the new LRS, and instructing the plurality of electronic devices to communicate subsequent control parameters via the second websocket server module.

It is to be understood that both the foregoing general description and the following detailed description are example and explanatory only and are not restrictive of the invention, as claimed.

DETAILED DESCRIPTION

Reference will now be made in detail to embodiments of the invention, which are illustrated in the accompanying drawings. The same reference numbers may be used throughout the drawings to refer to the same or like parts or operations.

Figure 1:
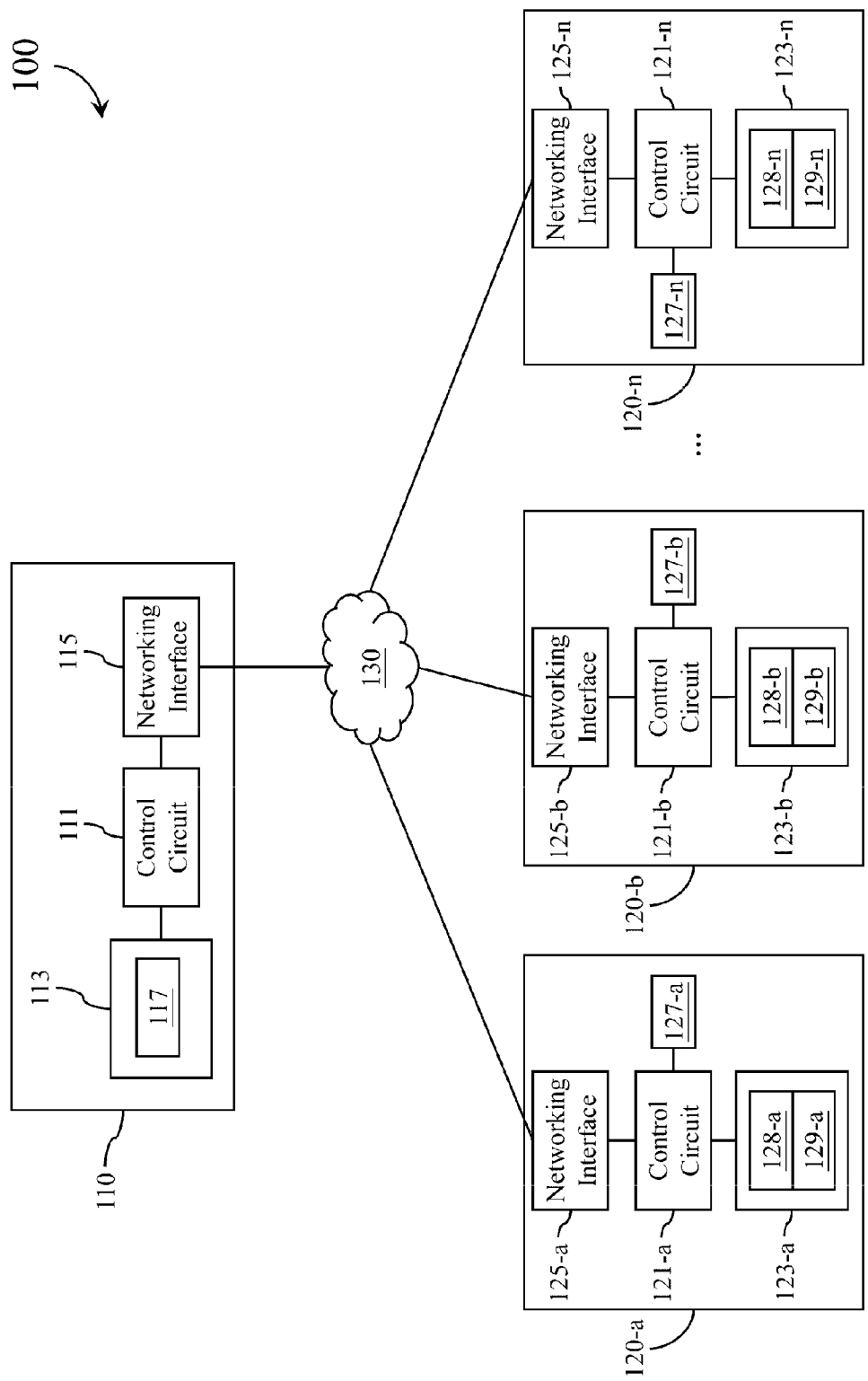
FIG. 1 is a simplified functional block diagram of a cross-platform multimedia interaction system according to an example embodiment.

Please refer to FIG. 1, which shows a simplified functional block diagram of a cross-platform multimedia interaction system 100 according to an example embodiment. The cross-platform multimedia interaction system 100 comprises a central relay server (CRS) 110, and a plurality of electronic devices (e.g., 120-a~120-n are shown as example). In the cross-platform multimedia interaction system 100, users may utilize the electronic devices 120-a~120-n to conduct interaction operations regarding multimedia contents, such as various online sport games, card games, role-playing games, action games, adventure game, strategy games, real-time strategy games, multimedia-related interaction, and multimedia-related collaborative editing.

In this embodiment, the electronic devices 120-a~120-n link to and communicate with the CRS 110 via the internet 130. In operations, the CRS 110 dynamically selects an appropriate electronic device from the electronic devices 120-a~120-n as a local relay server (LRS). The selected electronic device plays the role of a websocket server and acts as an intermediate for communicating control parameters among the electronic devices 120-a~120-n. The electronic devices 120-a~120-n generate corresponding multimedia contents, such as images, animations, or sounds, according to received control parameters. In other words, the cross-platform multimedia interaction system 100 is a system with dynamically-configured hierarchical servers.

As shown in FIG. 1, the CRS 110 comprises a control circuit 111, a storage device 113, and a networking interface 115, wherein the storage device 113 and the networking interface 115 are coupled with the control circuit 111. In addition, a server selection module 117 is stored in the storage device 113. In implementations, the server selection module 117 may be realized by one or more application programs. The storage device 113 may be realized by volatile memory or non-volatile memory. The control circuit 111 may be realized with one or more processor units. The networking interface 115 may be a wired networking interface, a wireless networking interface, or a hybrid circuit integrated with the above two functionalities. For the convenience of description, other components of the CRS 110 and related connections are not shown in FIG. 1. In implementations, the CRS 110 may be realized with multiple servers located in the same area, or may be realized with multiple servers located in different geographical areas.

Throughout the specification and drawings, indexes a~n may be used in the reference numbers of components and devices for ease of referring to respective components and devices. The use of indexes a~n does not intend to restrict the count of components and devices to any specific number. In the specification and drawings, if a reference number of a particular component or device is used without using the index, it means that the reference number is used to refer to any unspecific component or device of corresponding component group or device group. For example, the reference number 121-a is used to refer to the specific control circuit 121-a, and the reference number 121 is used to refer to any control circuit of the control circuits 121-a~121-n. In another example, the reference number 120-b is used to refer to the specific electronic device 120-b, and the reference number 120 is used to refer to any electronic device of electronic devices 120-a~120-n.

In the embodiment of FIG. 1, each of the electronic devices 120-a~120-n comprises a control circuit 121, a storage device 123, a networking interface 125, and a display 127, wherein the storage device 123, the networking interface 125, and the display 127 are coupled with the control circuit 121. The control circuit 121 may be realized with one or more processor units. The networking interface 125 may be a wired networking interface, a wireless networking interface, or a hybrid circuit integrated with the above two functionalities.

In addition, a web browser module 128 and a multimedia generating module 129 are stored in the storage device 123. The multimedia generating module 129 comprises a websocket server module and may be realized with one or more application programs. In implementations, the web browser module 128 and the multimedia generating module 129 may be integrated into a single functional module, or may be realized by different functional modules. For example, the web browser module 128 in the electronic device 120 may be integrated into the multimedia generating module 129.

In applications, the electronic devices 120-a~120-n may be a plurality of electronic devices having the same hardware specification and operating system, or may be a plurality of electronic devices having different hardware specifications and operating systems. In other words, the electronic devices 120-a~120-n may be various combination of desktop computers, desktop game machines, business machines, mobile electronic devices (such as mobile phones, tablet computers, notebook computers, netbook computers, e-books, or handheld game machines), or various home appliances (such as televisions, refrigerators, and audio playback systems) that are capable of connecting to the internet.

For the convenience of description, other components of the electronic device 120 and related connections are not shown in FIG. 1.

The operations of the cross-platform multimedia interaction system 100 will be further described in the following with reference to FIG. 2.

Figure 2:
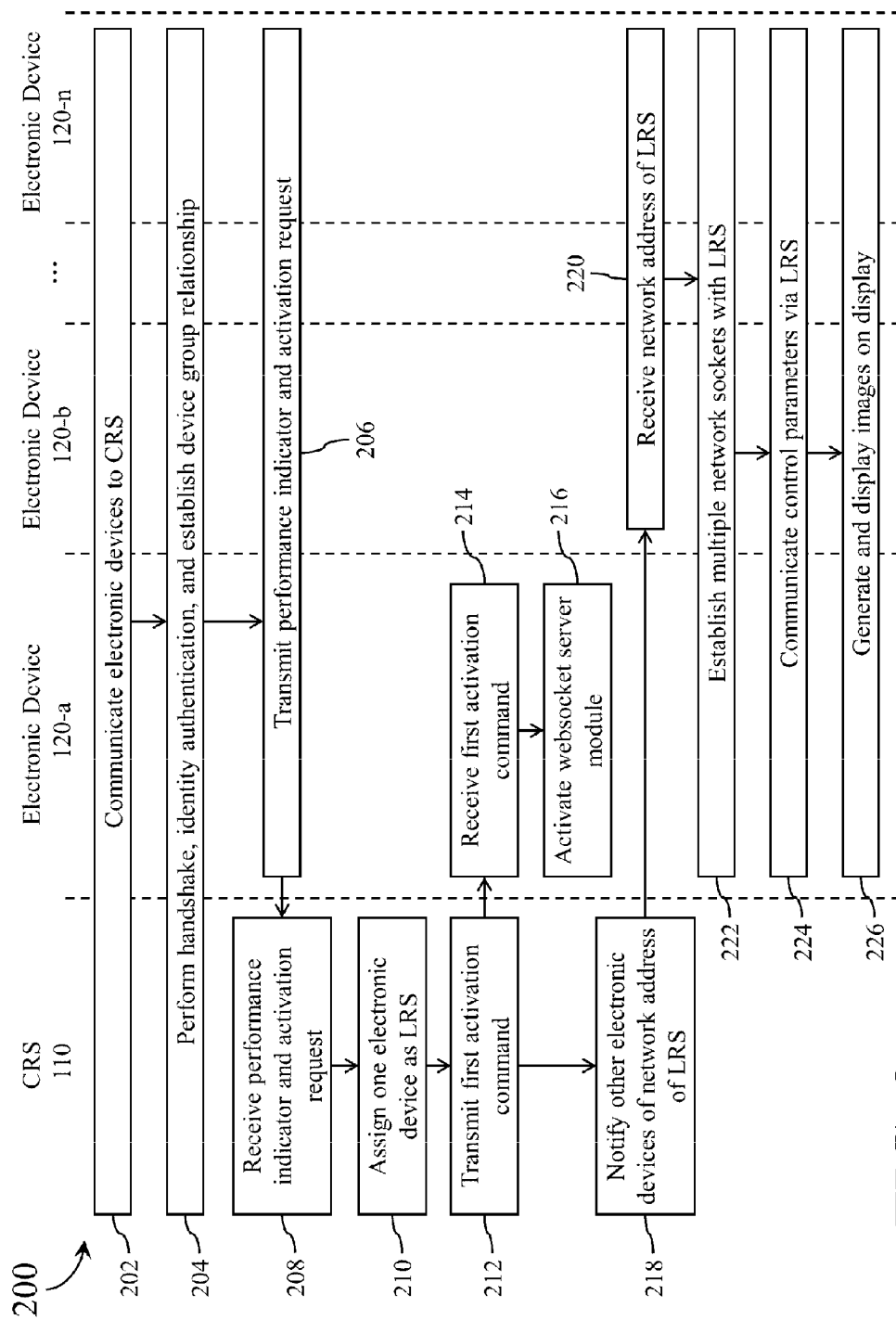
FIG. 2 is a simplified flowchart illustrating a multimedia generating method for use in the cross-platform multimedia interaction system of FIG. 1 in accordance with an example embodiment.

FIG. 2 is a simplified flowchart 200 illustrating a multimedia generating method for use in the cross-platform multimedia interaction system 100 in accordance with an example embodiment.

In the flowchart 200, operations within a column under the name of a specific device are operations to be performed by the specific device. For example, operations within a column under the label "CRS 110" are operations to be performed by the CRS 110, and operations within a column under the label "electronic device 120-a" are operations to be performed by the electronic device 120-a, and so forth. The same analogous arrangement is applicable to the subsequent flowcharts.

During performing the multimedia generating method illustrated in the flowchart 200, the control circuit 111 of the CRS 110 executes the server selection module 117 to enable the CRS 110 to perform partial or all operations within the corresponding column. The control circuit 121 of the electronic device 120 also executes the multimedia generating module 129 to enable the electronic device 120 to perform partial or all operations within the corresponding column.

In operation 202, the web browser modules 128-a~128-n communicate the electronic devices 120-a~120-n to the CRS 110 via the internet 130 and respective networking interfaces 125-a~125-n.

In operation 204, the CRS 110 and the electronic devices 120-a~120-n preform a handshake procedure, an identity authentication, and establish a device group relationship among the electronic devices 120-a~120-n. After the CRS 110 completed the handshake procedure with each of the electronic devices 120-a~120-n, the CRS 110 obtains the network address of the electronic devices 120-a~120-n.

During performing the identity authentication, the CRS 110 may generate related identity inquiry webpages and display the identity inquiry webpages on the display 127 through the web browser module 128 of the electronic device 120 to prompt the user of the electronic device 120 to input an identification code (such as the user's alias or ID number) and a password.

In one embodiment, when the CRS 110 establishes the device group relationship among the electronic devices 120-a~120-n, the CRS 110 may ask a user of the electronic device 120 that is first electronic device entering into the operation 204 to select or to input a specific group ID. Afterward, when other electronic devices 120 enter the operation 204, the CRS 110 may demand the users of these electronic devices 120 to select or to input a group ID, and then the CRS 110 groups the electronic devices 120 using the same group ID into a same device group. In applications, the user of the electronic device 120 first entering into the operation 204 may notify the users of the other electronic devices 120 of the selected or inputted group ID by using the telephone, email, instant communication software, oral notice, or other appropriate manners, so that the electronic devices 120 operated by these users can be grouped as the same device group by the CRS 110.

In addition, the CRS 110 in the operation 204 may also request the user of the electronic device 120 to input a device ID of the electronic device 120 via the web browser module 128, such as a unique device code or the MAC address of the electronic device 120, to increase the security level of the identity authentication. Alternatively, the CRS 110 may request the user of the electronic device 120 to input the device ID of the electronic device 120 only at the first time the electronic device 120 enters into the operation 204, and record the pairing relationship of the device ID and the user's identification code in the storage device 113.

In one embodiment, after the electronic device 120 completed the handshake procedure with the CRS 110, the electronic device 120 and the CRS 110 terminate a network session between them so as to reduce the bandwidth loading of the CRS 110. For example, when the electronic device 120 completed the handshake procedure with the CRS 110, the web browser module 128 may perform other procedures in the operation 204 and subsequent operations by transmitting AJAX (Asynchronous JavaScript and XML) commands to the CRS 110. Since after the web browser module 128 transmitted the AJAX commands to the CRS 110, the network session between the electronic device 120 and the CRS 110 would be terminated, and thus the loading of the CRS 110 can be effectively reduced. In implementations, instead of using the AJAX commands, other approaches may be employed to terminate the network session between the electronic device 120 and the CRS 110 after the handshake procedure to reduce required networking bandwidth of the CRS 110.

In operation 206, the electronic devices 120-a~120-n respectively utilize the web browser modules 128-a~128-n to transmit their respective performance indicators to the CRS 110 via the internet 130. The performance indicators of each electronic device 120 comprise one or more of the following messages: a processor computing power of the electronic device 120, a total memory capacity of the electronic device 120, a remaining memory capacity of the electronic device 120, a remaining battery level of the electronic device 120, and a next hop count of the electronic device 120. Alternatively, the performance indicators may be a comprehensive parameter calculated based on the above messages. The afore-mentioned next hop count may refer to a next hop count between the electronic device 120 and the CRS 110, a next hop count between the electronic device 120 and the LRS, or a total next hop count between the electronic device 120 and each of other electronic devices in the cross-platform multimedia interaction system 100.

In addition to the performance indicator, the electronic device 120 in the operation 206 may utilize the web browser module 128 to transmit an activation request to the CRS 110 via the internet 130 to request the CRS 110 to choose the electronic device 120 as a local relay server.

In operation 208, the CRS 110 receives the performance indicators and activation request from each of the electronic devices 120-a~120-n.

In operation 210, the CRS 110 dynamically assigns one of the electronic devices 120-a~120-n as a local relay server (LRS). In one embodiment, the CRS 110 may simply select the electronic device corresponding to the first received activation request as the LRS. For the purpose of explanatory convenience in the following description, it is assumed herein that the CRS 110 selects the electronic device 120-a as the LRS in the operation 210.

In operation 212, the CRS 110 transmits a first activation command to the selected electronic device 120-a via the internet 130 to make it become the LRS and instruct the electronic device 120-a to activate the websocket server module of the electronic device 120-a.

In operation 214, the electronic device 120-a receives the first activation command through the web browser module 128-a.

Then, the electronic device 120-a performs operation 216 to utilize the control circuit 121-a to execute the websocket server module of the multimedia generating module 129-a to activate the websocket server module of the electronic device 120-a, so that the electronic device 120-a begins to provide websocket server functionalities.

In operation 218, the CRS 110 notifies other electronic devices 120-b~120-n of a network address of the LRS, e.g., an IP address of the electronic device 120-a in this case, via the internet 130.

In operation 220, the electronic devices 120-b~120-n receive the network address transmitted from the CRS 110 through the web browser modules 128-b~128-n.

After the electronic device 120-a activated its websocket server module to act as the LRS, the electronic devices 120-b~120-n proceed to operation 222 to utilize the web browser modules 128-b~128-n to establish multiple network sockets with the LRS.

In operation 224, the electronic devices 120-a~120-n utilize the web browser modules 128-a~128-n to communicate control parameters among the electronic devices 120-a~120-n via the websocket server module in the LRS (e.g., the electronic device 120-a in this case). The aforementioned control parameters are parameters employed by one electronic device to configure, control, change, or adjust the multimedia contents presented by another electronic device. For example, the control parameters may be related to the image attributes, such as the shape, size, color, position, lasting time, moving direction, or moving speed of one or more image objects.

When the electronic device 120-b want to transmit a first control parameter to the electronic device 120-c, the electronic device 120-b may utilize the web browser module 128-b to transmit the first control parameter to the websocket server module in the LRS via a first network socket between the electronic device 120-b and the LRS. The websocket server module in the LRS receives the first control parameter through the first network socket and stores the first control parameter.

Then, the electronic device 120-c may utilize the web browser module 128-c to inquiry the LRS about whether there is any control parameter generated by other electronic device to be transmitted to the electronic device 120-c using a polling method via a second network socket between the electronic device 120-c and the LRS. When the web browser module 128-c of the electronic device 120-c detected that the first control parameter stored in the LRS is to be transmitted to the electronic device 120-c, the web browser module 128-c retrieves the first control parameter from the websocket server module in the LRS via the second network socket.

Alternatively, the websocket server module of the LRS may actively transmit the first control parameter to the web browser module 128-c of the electronic device 120-c via the second network socket by using an appropriate web communication protocol, such as the HTML5 protocol.

Similarly, the electronic device 120-c want to transmit a second control parameter to the electronic device 120-b, the electronic device 120-c may utilize the web browser module 128-c to transmit the second control parameter to the websocket server module in the LRS via the second network socket. The websocket server module in the LRS receives the second control parameter through the second network socket and stores the second control parameter.

Then, the electronic device 120-b may utilize the web browser module 128-b to inquiry the LRS about whether there is any control parameter generated by other electronic device to be transmitted to the electronic device 120-b using a polling method via a first network socket. When the web browser module 128-b of the electronic device 120-b detected that the second control parameter stored in the LRS is to be transmitted to the electronic device 120-b, the web browser module 128-b retrieves the second control parameter from the websocket server module in the LRS via the first network socket.

Alternatively, the websocket server module of the LRS may actively transmit the second control parameter to the web browser module 128-b of the electronic device 120-b via the first network socket.

As can be appreciated from the foregoing descriptions, when any of the electronic devices 120-a~120-n want to transmit control parameters to other electronic devices, the electronic device utilizes the web browser module 128 to transmit the control parameters to the websocket server module in the LRS. Other electronic devices then utilize respective web browser modules 128 to receive the control parameters from the websocket server module of the LRS. In this way, the electronic devices 120-a~120-n may utilize the websocket server module in the LRS as an intermediate for control parameter communication, so that the CRS 110 needs not to act as an intermediate for communicating control parameters among the electronic devices 120-a~120-n. As a result, the communication bandwidth requirement of the CRS 110 can be significantly reduced.

In some embodiments, when the foregoing multimedia generating method is applied in a multi-user interaction operation regarding image contents, the electronic device 120 further performs operation 226 to generate one or more corresponding images according to the control parameters retrieved from the websocket server module of the LRS, and utilizes the web browser module 128 to display the one or more images on the display 127. In the operation 226, the control circuit 121 of the electronic device 120 may configure or adjust the images attributes, such as shape, size, color, position, lasting time, moving direction, or moving speed, of one or more image objects according to the retrieved control parameters to generate one or more corresponding images, and then utilizes the web browser module 128 to display the one or more images on the display 127.

Taking the afore-mentioned electronic device 120-b as an example. The control circuit 121-b of the electronic device 120-b in the operation 226 may generate one or more corresponding images according to the second control parameter retrieved from the LRS, and then utilizes the web browser module 128-b to display the one or more images no the display 127-b to present updated images to the user of the electronic device 120-b. Similarly, the control circuit 121-c of the electronic device 120-c in the operation 226 may generate one or more corresponding images according to the first control parameter retrieved from the LRS, and then utilizes the web browser module 128-c to display the one or more images on the display 127-c to present updated images to the user of the electronic device 120-c.

In other words, the electronic device 120-b is capable of changing the images displayed on the display 127-c of the electronic device 120-c by transmitting the first control parameter to the electronic device 120-c via the websocket server module of the LRS, and the electronic device 120-c is capable of changing images displayed on the display 127-b of the electronic device 120-b by transmitting the second control parameter to the electronic device 120-b via the websocket server module. In this way, the user of the electronic device 120-b and the electronic device 120-c are allowed to use the electronic device 120-b and the electronic device 120-c to conduct interaction operations regarding image contents.

Similarly, other electronic devices of the cross-platform multimedia interaction system 100 can also conduct interaction operations regarding multimedia contents with each other by using the afore-mentioned method.

In implementations, some multimedia data, such as background images, initial image objects, or animations, or parameters for generating above multimedia data required by the electronic devices 120-a~120-n during conducting the interaction operations regarding multimedia contents, may be provided by the CRS 110 or other multimedia server. For example, in one embodiment, the control circuit 111 of the CRS 110 provides same multimedia data for the electronic devices 120-a~120-n, and links the multimedia data to a single URL (uniform resource locator). In this embodiment, the web browser modules 128-a~128-n of the electronic devices 120-a~120-n may link to the single URL to retrieve the same multimedia data.

In another embodiment, the control circuit 111 of the CRS 110 may provide different multimedia data for different electronic devices according to their respective roles in the multimedia interaction operations, and links different multimedia data to different web addresses. In this embodiment, different electronic devices of the electronic devices 120-a~120-n may link to the CRS 110 via different web addresses according to a predetermined rule or based on the user configuration to retrieve the multimedia data as needed.

For example, the control circuit 111 of the CRS 110 may provide a first type data for the electronic device playing a master role in the multimedia interaction operations and link the first type data to a first web address. Additionally, the CRS 110 may provide a second type data for the electronic device playing a slave role in the multimedia interaction operations and link the second type data to a second web address. Under such arrangements, one or more electronic devices of the electronic devices 120-a~120-n, such as the electronic devices 120-a and 120-b, may link to the CRS 110 via the first web address to retrieve the first type data, and another one or more electronic devices of the electronic devices 120-a~120-n, such as the electronic devices 120-c and 120-n, may link to the CRS 110 via the second web address to retrieve the second type data.

In implementations, the electronic device 120 may generate corresponding images according to the multimedia data provided by the CRS 110, and display on the display 127 together with the images generated in the operation 226. For example, in the previous embodiment where the electronic device 120-b and the electronic device 120-c conduct multimedia interaction operations, the web browser module 128-b of the electronic device 120-b may generate a first image according to the first type data and display on the display 127-b, and the web browser module 128-c of the electronic device 120-c may generate a second image according to the second type data and display on the display 127-c.

Similarly, other electronic device (such as the electronic device 120-n) may generate the first image according to the first type data and display on its own display (e.g., the display 127-n in this case), or may generate the second image according to the second type data and display on its own display.

In operation, according to the user's configuration, the same electronic device 120 may link to the CRS 110 via different web addresses in the same or different time periods to retrieve different multimedia data for use in different type of electronic devices. As a result, the same electronic device 120 is allowed to switch between different roles in the multimedia interaction operations.

In addition, some or all communication data (such as game parameters, game scores, and chatting records) stored in the LRS may be duplicated to other one or more electronic devices during the operations of the LRS. For example, the websocket server module of the LRS (e.g., the electronic device 120-a in this case) may actively transmit some or all control parameters stored in the LRS to other one or more electronic devices for backup purpose. Alternatively, when a particular electronic device inquires the LRS about whether there is any control parameters to be retrieved by using a polling method, the websocket server module of the LRS may provide control parameters to be transmitted to the particular electronic device and other control parameters to the particular electronic device for backup purpose.

In another embodiment, the CRS 110 in the operation 210 may select one of the electronic devices 120-a~120-n as the LRS according to respective performance indicators of the electronic devices 120-a~120-n. For example, the CRS 110 may compare only a single performance indicator of the electronic devices 120-a~120-n, and select an electronic device having the best performance in the single performance indicator as the LRS. Alternatively, the CRS 110 may take multiple performance indicators of the electronic devices 120-a~120-n into consideration, such as performing a weight blending on the multiple performance indicators of each electronic device 120, and select an electronic device having the best performance under the comprehensive evaluation as the LRS.

As described previously, the CRS 110 obtains the respective network addresses of the electronic devices 120-a~120-n in the operation 204. Accordingly, when the CRS 110 in the operation 210 performs the single performance indicator comparison or the comprehensive evaluation of multiple performance indicators, the CRS 110 may take a count of neighboring electronic devices located within the same predetermined network section as a particular electronic device 120 as another performance indicator of the particular electronic device 120, and take it into consideration in the operation 210.

Figure 3:
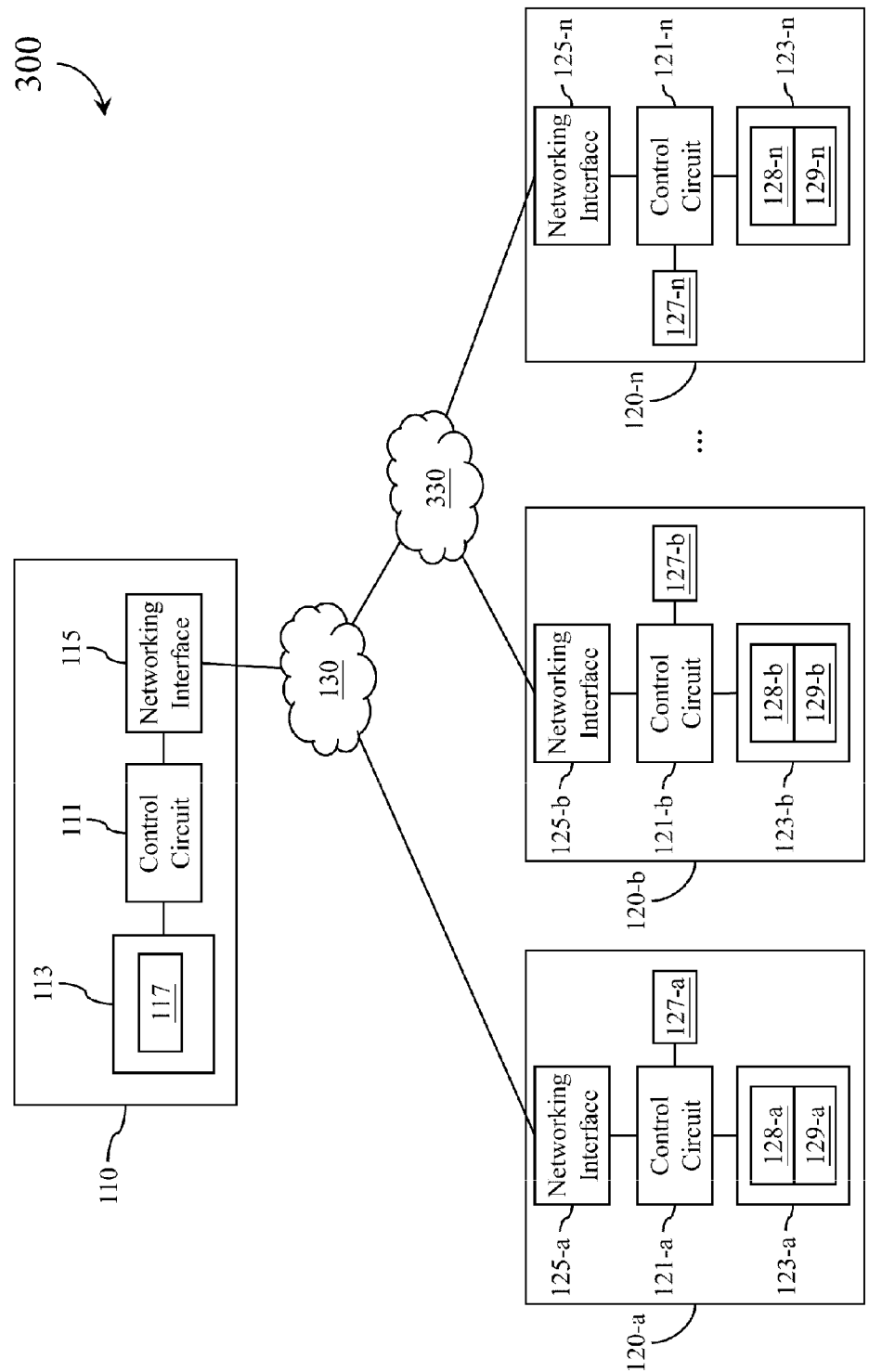
FIG. 3 is a simplified functional block diagram of a cross-platform multimedia interaction system according to another example embodiment.

For example, FIG. 3 shows a simplified functional block diagram of a cross-platform multimedia interaction system 300 according to another example embodiment. In the embodiment of FIG. 3, the electronic device 120-a is directly connected to the CRS 110 via the Internet 130, and the electronic devices 120-b~120-n are connected to the internet 130 via an intranet 330 and then indirectly connected to the CRS 110. Accordingly, the electronic devices 120-b~120-n are located in the same or neighboring network sections. In the cross-platform multimedia interaction system 300, the CRS 110 in the operation 210 may select an electronic device having the greatest amount of neighboring electronic devices or having a greatest next hop count, such as one of the electronic devices 120-b~120-n, to be the LRS. Such method of selecting the LRS improves the speed of generating and interacting multimedia contents in the cross-platform multimedia interaction system 300.

Figure 4:
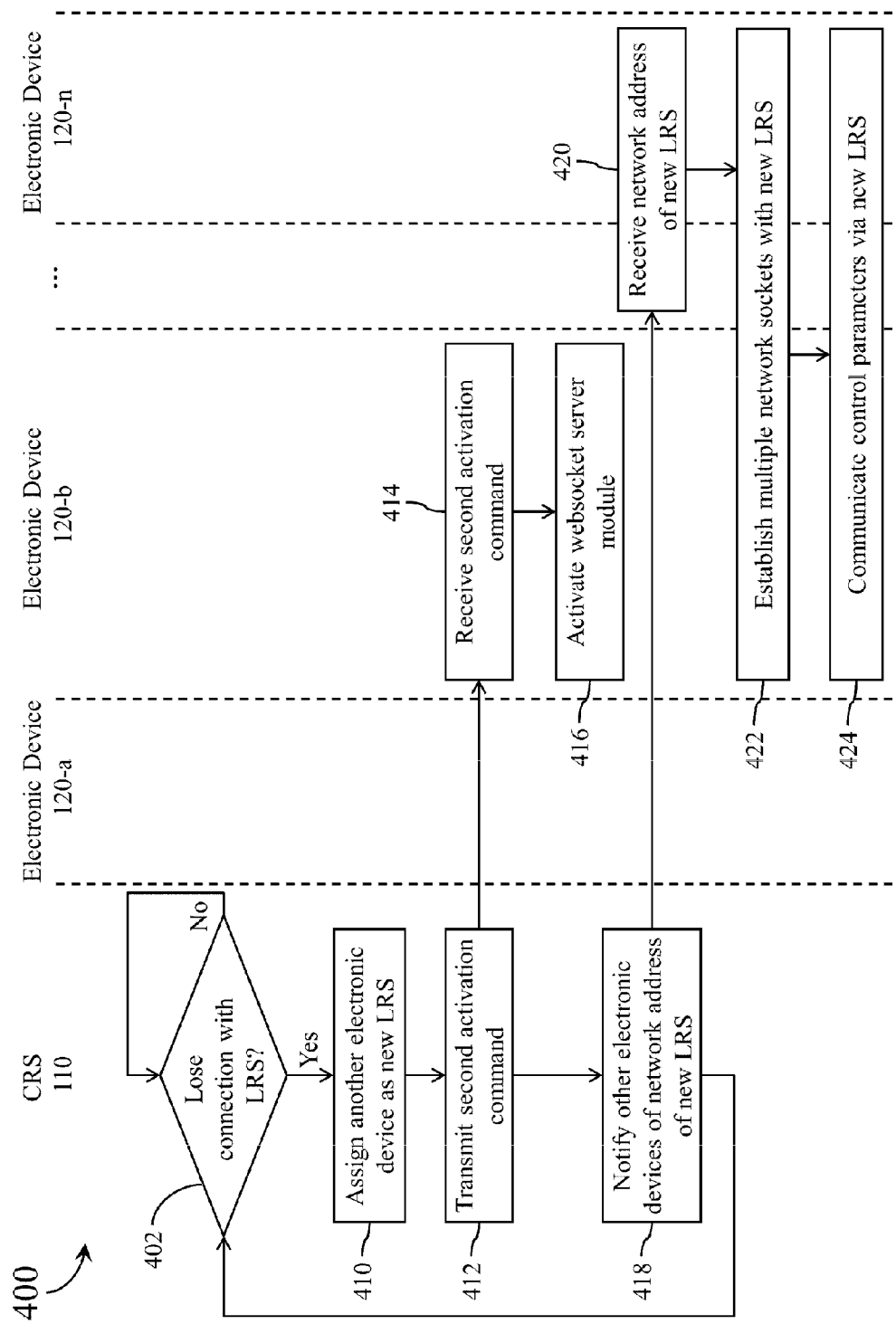
FIG. 4 is a simplified flowchart illustrating a method for dynamically changing a local relay server of the cross-platform multimedia interaction system of FIG. 1 in accordance with an example embodiment.

FIG. 4 is a simplified flowchart 400 illustrating a method for dynamically changing a local relay server of the cross-platform multimedia interaction system 100 in accordance with an example embodiment. In this embodiment, the control circuit 111 of the CRS 110 executes the server selection module 117 to enable the CRS 110 to perform some or all operations within the corresponding column. The control circuit 121 of the electronic device 120 executes the multimedia generating module 129 to enable the electronic device 120 to perform some or all operations within the corresponding column. While performing the multimedia generating method of the flowchart 200, the cross-platform multimedia interaction system 100 may simultaneously perform the method of the flowchart 400 to dynamically change the LRS.

For example, the CRS 110 may begin to perform operation 402 of the flowchart 400 after a certain period since completing the operation 218 of the flowchart 200 to intermittently detect the situation of network connection with the LRS (e.g., the electronic device 120-a in this case). If the CRS 110 loses the connection with the LRS, e.g., when the LRS is powered off or the networking interface of the LRS malfunctions, the CRS 110 performs operation 410 to assign other electronic device as a new LRS to replace the current LRS.

In the operation 410, the CRS 110 may assign another electronic device of the electronic devices 120-a~120-n as the new LRS according to respective performance indicators of the electronic devices 120-a~120-n. Similar with the previous embodiment, the performance indicators of each electronic device comprise at least one of the following messages: a processor computing power of the electronic device 120, a total memory capacity of the electronic device 120, a remaining memory capacity of the electronic device 120, a remaining battery level of the electronic device 120, a count of neighboring electronic devices located within a same predetermined network section as the electronic device 120, and a next hop count of the electronic device 120.

The description regarding the implementations for the operation 210 in the previous embodiment is also applicable to the operation 410.

In this embodiment, the CRS 110 selects the electronic device 120-b as the new LRS in the operation 410.

In operation 412, the CRS 110 transmits a second activation command to the electronic device 120-b via the internet 130 to instruct the electronic device 120-b to activate the websocket server module of the electronic device 120-b.

In operation 414, the electronic device 120-b receives the second activation command via the web browser module 128-b.

Then, the electronic device 120-b proceeds to operation 416 to utilize the control circuit 121-b to execute the websocket server module in the multimedia generating module 129-b to activate the websocket server module in the electronic device 120-b, so that the electronic device 120-b begins to provide websocket server functionalities.

In operation 418, the CRS 110 notify the other electronic devices 120-c~120-n of a network address of the new LRS, e.g., an IP address of the electronic device 120-b in this case, via the internet 130.

In operation 420, the electronic devices 120-c~120-n utilize the web browser modules 128-c~128-n to receive the network address transmitted from the CRS 110.

After the electronic device 120-b activated its websocket server module, the electronic devices 120-c~120-n proceed to operation 422 to utilize the web browser modules 128-c~128-n to establish multiple network sockets between the new LRS and the electronic devices 120-c~120-n.

In operation 424, the electronic devices 120-b~120-n utilize the web browser modules 128-b~128-n to communicate subsequent control parameters with each other via the websocket server module of the electronic device 120-b. The description regarding the implementations for the operation 224 in the previous embodiment is also applicable to the operation 424.

Figure 5:
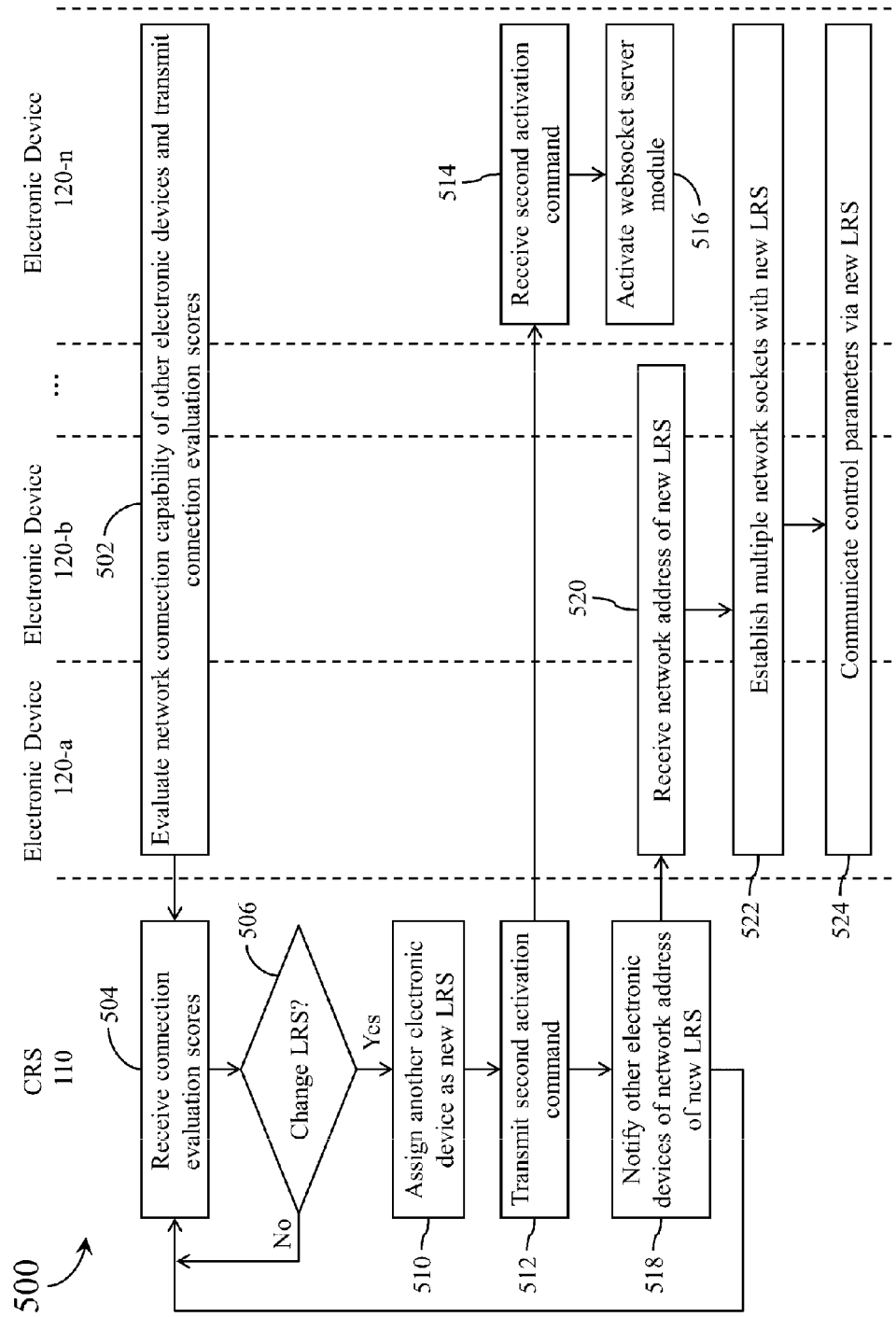
FIG. 5 is a simplified flowchart illustrating a method for dynamically changing a local relay server of the cross-platform multimedia interaction system of FIG. 1 in accordance with another example embodiment.

FIG. 5 is a simplified flowchart 500 illustrating a method for dynamically changing a local relay server of the cross-platform multimedia interaction system 100 in accordance with another example embodiment. When performing the method of the flowchart 500, the control circuit 111 of the CRS 110 executes the server selection module 117 to enable the CRS 110 to perform some or all operations within the corresponding column. The control circuit 121 of the electronic device 120 executes the multimedia generating module 129 to enable the electronic device 120 to perform some or all operations within the corresponding column. While performing the multimedia generating method of the flowchart 200, the cross-platform multimedia interaction system 100 may simultaneously perform the method of the flowchart 500 to dynamically change the LRS.

In one embodiment, the electronic device 120 may begin to perform operation 502 of the flowchart 500 after a certain period since completing the operation 222 of the flowchart 200 to intermittently evaluate the network connection capability of other electronic devices, and periodically utilize the web browser module 128 to transmit connection evaluation scores regarding other electronic devices to the CRS 110 via the Internet 130. For example, the electronic device 120 may periodically try to establish connections with other electronic devices of the cross-platform multimedia interaction system 100. Each time the electronic device 120 successfully established a connection with a particular electronic device, the electronic device 120 may increase the connection evaluation score of the particular electronic device.

In addition, the electronic device 120 may adjust the increment when increasing the connection evaluation score of the particular electronic device according to the network connection type of the particular electronic device. For example, each time the electronic device 120-$b$ successfully established a connection with the electronic device 120-$c$, the electronic device 120-$b$ may increase the connection evaluation score of the electronic device 120-$c$ by 3 points if the electronic device 120-$c$ is connected to the internet via a connection cable; and the electronic device 120-$b$ may increase the connection evaluation score of the electronic device 120-$c$ by 1 point if the electronic device 120-$c$ is connected to the internet using a wireless approach.

In operation 504, the CRS 110 may utilize the server selection module 117 to receive a plurality of connection evaluation scores regarding respective electronic devices transmitted from the electronic devices 120-$a$~120-$n$ via the internet 130.

The CRS 110 may periodically perform operation 506 to determine whether to change the LRS.

In one embodiment of the operation 506, the CRS 110 may compare the connection evaluation scores of the electronic devices 120-$a$~120-$n$, and decide whether to replace the LRS according to the comparison result. For example, the CRS 110 may decide to replace the current LRS when detected that there is another electronic device having a connection evaluation score superior to the connection evaluation score of the current LRS. Alternatively, the CRS 110 may decide to replace the current LRS when detected that there is another electronic device having a connection evaluation score superior to the connection evaluation score of the current LRS over a predetermined degree, such as 20% or 30%.

In another embodiment, any one of the electronic devices 120-$a$~120-$n$ may intermittently detect the situation of network connection with the LRS. If the electronic device 120 loses the connection with the LRS or the connection speed is lower than a threshold, then the electronic device 120 may utilize its web browser module to transmit a change request to the CRS 110 to request the CRS 110 to replace the current LRS. Therefore, in addition to compare the connection evaluation scores of the electronic devices 120-$a$~120-$n$, the CRS 110 in the operation 506 may also detect whether other electronic device of the electronic devices 120-$a$~120-$n$ transmits a change request. The CRS 110 may decide to replace the current LRS only if the CRS 110 receives a change request. That is, when another electronic device's connection evaluation score is superior to the current LRS's connection evaluation score, the CRS 110 of this embodiment may replace the current LRS only if the CRS 110 received a change request from other electronic device.

In operation 510, the CRS 110 may select another electronic device in the electronic devices 120-$a$~120-$n$ as a new LRS according to respective connection evaluation scores of the electronic devices 120-$a$~120-$n$. For example, the CRS 110 may select another electronic device whose connection evaluation score is superior to the current LRS's connection evaluation score as a new LRS.

In this embodiment, the CRS 110 selects the electronic device 120-$n$ as the new LRS in the operation 510.

In operation 512, the CRS 110 transmits an activation command to the electronic device 120-$n$ via the internet 130 to instruct the electronic device 120-$n$ to activate the websocket server module of the electronic device 120-$n$.

In operation 514, the electronic device 120-$n$ utilizes the web browser module 128-$n$ to receive the activation command.

Then, the electronic device 120-$n$ performs operation 516 to utilize the control circuit 121-$b$ to execute the websocket server module of the multimedia generating module 129-$n$, so that the electronic device 120-$n$ begins to provide websocket server functionalities.

In operation 518, the CRS 110 notifies the other electronic devices 120-$a$~120-$m$ of the new LRS's network address, e.g., an IP address of the electronic device 120-$n$, via the internet 130.

In operation 520, the electronic devices 120-$a$~120-$m$ utilize the web browser modules 128-$a$~128-$m$ to receive the network address transmitted from the CRS 110.

After the electronic device 120-$n$ activated its own websocket server module, the electronic devices 120-$a$~120-$m$ perform operation 522 to utilize the web browser modules 128-$a$~128-$m$ to establish multiple network sockets between the new LRS and the electronic devices 120-$a$~120-$m$.

In operation 524, the electronic devices 120-$a$~120-$n$ utilize the web browser modules 128-$a$~128-$n$ to communicate subsequent control parameters with each other via the websocket server module of the electronic device 120-$n$. The description regarding the implementations for the operation 224 in the previous embodiment is also applicable to the operation 524.

Figure 6:
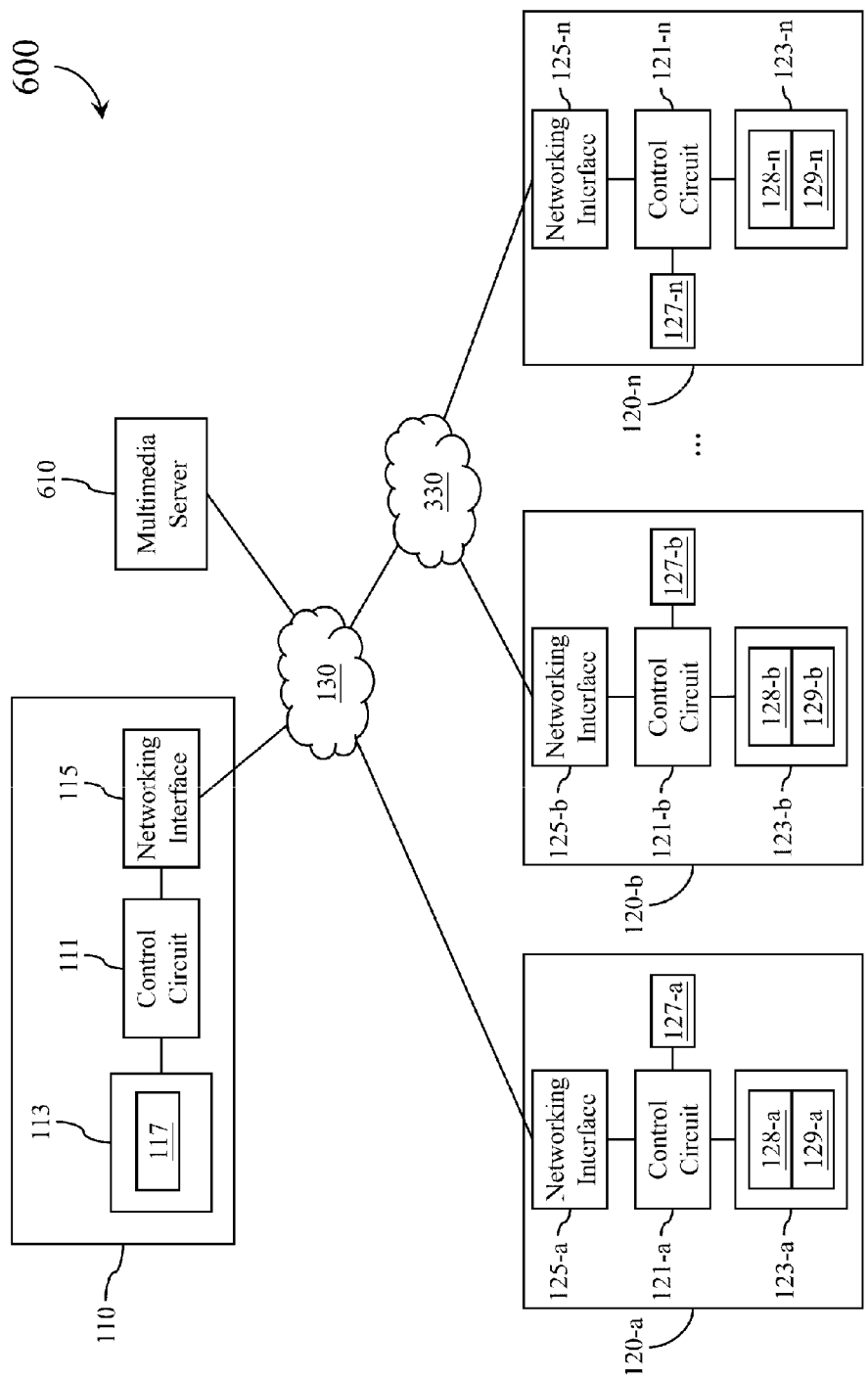
FIG. 6 is a simplified functional block diagram of a cross-platform multimedia interaction system according to yet another example embodiment.

As described previously, some multimedia data, such as background images, initial image objects, or animations, or parameters for generating above multimedia data required for the electronic devices 120-$a$~120-$n$ during conducting the interaction operations regarding multimedia contents, may be provided by other multimedia server than the CRS 110. For example, FIG. 6 is a simplified functional block diagram of a cross-platform multimedia interaction system 600 according to yet another example embodiment. In the cross-platform multimedia interaction system 600, the CRS 110 acts similar as in the previous embodiments, but multimedia data required by the electronic devices 120-$a$~120-$n$ during conducting the interaction operations regarding multimedia contents is provided by a multimedia server 610. In implementations, the multimedia server 610 may be realized with multiple servers located in the same area, or may be realized with multiple servers located in different geographical areas.

In one embodiment, the multimedia server 610 provides same multimedia data for the electronic devices 120-$a$~120-$n$, and links the multimedia data to a single URL. In this embodiment, the web browser modules 128-$a$~128-$n$ of the electronic devices 120-$a$~120-$n$ may link to the single URL to retrieve the same multimedia data generated by the multimedia server 610.

In another embodiment, the multimedia server 610 may provide different multimedia data for different electronic devices according to their respective roles in the multimedia interaction operations, and links different multimedia data to different web addresses. In this embodiment, different electronic devices of the electronic devices 120-$a$~120-$n$ may link to the multimedia server 610 via different web addresses according to a predetermined rule or based on the user configuration to retrieve the multimedia data as needed.

For example, the multimedia server 610 may provide a first type data for the electronic device playing a master role in the multimedia interaction operations and link the first type data to a first web address. Additionally, the multimedia server 610 may provide a second type data for the electronic device playing a slave role in the multimedia interaction operations and link the second type data to a second web address. Under such arrangements, one or more electronic devices of the electronic devices 120-a~120-n, such as the electronic devices 120-a and 120-b, may link to the multimedia server 610 via the first web address to retrieve the first type data, and other one or more electronic devices of the electronic devices 120-a~120-n, such as the electronic devices 120-c and 120-n, may link to the multimedia server 610 via the second web address to retrieve the second type data.

In implementations, the electronic device 120 may generate corresponding images according to the multimedia data provided by the multimedia server 610, and display on the display 127 together with the images generated in the operation 226. For example, in the previous embodiment where the electronic device 120-b and the electronic device 120-c conduct multimedia interaction operations, the web browser module 128-b of the electronic device 120-b may generate a first image according to the first type data and display on the display 127-b, and the web browser module 128-c of the electronic device 120-c may generate a second image according to the second type data and display on the display 127-c.

Similarly, other electronic device (such as the electronic device 120-n) may generate the first image according to the first type data and display on its own display (e.g., the display 127-n in this case), or may generate the second image according to the second type data and display on its own display.

In operation, according to the user's configuration, the same electronic device 120 may link to the multimedia server 610 via different web addresses in the same or different time periods to retrieve different multimedia data for use in different type of electronic devices. As a result, the same electronic device 120 is allowed to switch between different roles in the multimedia interaction operations.

The structure of FIG. 6 further reduces the work loading of the CRS 110. In addition, multiple multimedia servers of different purpose may be employed in the cross-platform multimedia interaction system 600 to provide more multimedia-related interaction options to the users of the electronic devices 120-a~120-n.

The execution order of the operations in the previous flowcharts 200, 400, or 500 is merely an example, rather than a restriction to practical implementations. For example, in the flowchart 200, the operations 206 and 208 may be performed simultaneously and the operations 212 and 218 may be performed simultaneously or swapped. In addition, the electronic devices 120-a~120-n may intermittently perform the operation 206 after the operation 224 or 226. In the flowchart 400, the operations 412 and 418 may be performed simultaneously or swapped. Additionally, the CRS 110 may intermittently perform the operation 402 after the operation 418. In the flowchart 500, the operations 502 and 504 may be performed simultaneously and the operations 512 and 518 may be performed simultaneously or swapped. In addition, the CRS 110 may intermittently perform the operation 504 after the operation 518.

In the afore-mentioned embodiments, each of the multimedia generating modules 129-a~129-n of the electronic devices 120-a~120-n comprises a websocket server module, but this is merely an example, rather than a restriction of the practical implementations. For example, in another embodiment, only some electronic devices are provided with a multimedia generating module having a websocket server module therein, while the other electronic devices are provided with a multimedia generating module without the websocket server module therein.

As can be seen from the foregoing descriptions, the cross-platform multimedia interaction systems 100, 300, and 600 are systems with dynamically-configured hierarchical servers. The CRS 110 dynamically assigns a LRS so that the electronic devices 120-a~120-n utilize the web browser modules 128-a~128-n to communicate control parameters with each other via the websocket server module in the LRS. In this way, the CRS 110 needs not to act as a transmission intermediate of control parameters among the electronic devices 120-a~120-l n. Accordingly, no extra communication circuit is required to be installed in each of the electronic devices 120-a~120-n. Above structure is also applicable to the application where the electronic devices 120-a~120-n have different operating systems. In addition, communicating control parameters among the electronic devices 120-a~120-n via the LRS not only reduces the work loading of the CRS 110, but also increases the response speed of multimedia-related interaction operations conducted by the electronic devices 120-a~120-n.

Certain terms are used throughout the description and following claims to refer to particular components. As one skilled in the art will appreciate, a component may be referred by different names. This document does not intend to distinguish between components that differ in name but not in function. In the following description and in the claims, the term "comprise" is used in an open-ended fashion, and thus should be interpreted to mean "include, but not limited to . . . ." Also, the phrase "coupled with" is intended to compass any indirect or direct connection. Accordingly, if this document mentioned that a first device is coupled with a second device, it means that the first device may be directly or indirectly connected to the second device through electrical connections, wireless communications, optical communications, or other signal connections with/without other intermediate devices or connection means.

As used herein, the term "and/or" includes any and all combinations of one or more of the associated listed items. In addition, the singular forms "a", "an", and "the" as used herein are intended to include the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A cross-platform multimedia interaction system with dynamically-configured hierarchical servers, comprising:
　a central relay server (CRS);
　a plurality of electronic devices for communicating with the CRS to conduct an identity authentication; and
　a plurality of displays respectively arranged on the plurality of electronic devices;
　wherein the CRS dynamically assigns one of the plurality of electronic devices as a local relay server (LRS) and instructs the LRS to activate a websocket server module, and the CRS notifies the other electronic devices of a network address of the LRS;
　wherein after the LRS activated the websocket server module, other electronic devices of the plurality of electronic devices establish one or more network sockets with the LRS, and the plurality of electronic devices communicate control parameters via the websocket server module, generate corresponding images according to received control parameters, and respectively display the resulting images on the plurality of displays.

2. The cross-platform multimedia interaction system of claim 1, wherein the plurality of electronic devices comprise a first electronic device and a second electronic device, the first electronic device transmits a first control parameter to the second electronic device via the websocket server module to change images displayed on the display of the second electronic device, and the second electronic device transmits a second control parameter to the first electronic device via the websocket server module to change images displayed on the display of the first electronic device.

3. The cross-platform multimedia interaction system of claim 2, wherein the first electronic device comprises a first web browser module for transmitting the first control parameter and receiving the second control parameter, and the second electronic device comprises a second web browser module for receiving the first control parameter and transmitting the second control parameter.

4. The cross-platform multimedia interaction system of claim 3, wherein the first web browser module transmits the first control parameter to the websocket server module, and the second web browser module retrieves the first control parameter from the websocket server module using a polling method; and the second web browser module transmits the second control parameter to the websocket server module, and the first web browser module retrieves the second control parameter from the websocket server module using a polling method.

5. The cross-platform multimedia interaction system of claim 4, wherein when the first electronic device completes a handshake procedure with the CRS, the first electronic device and the CRS terminal a session between the first electronic device and the CRS.

6. The cross-platform multimedia interaction system of claim 5, wherein when the first electronic device completes the handshake procedure with the CRS, the first electronic device transmits an AJAX command to the CRS to terminal the session between the first electronic device and the CRS.

7. The cross-platform multimedia interaction system of claim 5, wherein the first web browser module generates one or more images according to the second control parameter, and displays the one or more images on the display of the first electronic device.

8. The cross-platform multimedia interaction system of claim 7, wherein the CRS generates a first type data and a second type data, the first electronic device links to the CRS via a first web address to retrieve the first type data, and the second electronic device links to the CRS via a second web address to retrieve the second type data.

9. The cross-platform multimedia interaction system of claim 8, wherein the first web browser module generates a first image according to the first type data and displays the first image on the display of the first electronic device, and the second web browser module generates a second image according to the second type data, and displays the second image on the display of the second electronic device.

10. The cross-platform multimedia interaction system of claim 9, wherein a third electronic device of the plurality of electronic devices links to the CRS via the first web address to retrieve the first type data, and a third web browser module of the third electronic device generates the first image according to the first type data and displays the first image on the display of the third electronic device.

11. The cross-platform multimedia interaction system of claim 7, further comprising:
a multimedia server for generating a first type data and a second type data;
wherein the first electronic device links to the multimedia server via a first web address to retrieve the first type data, and the second electronic device links to the multimedia server via a second web address to retrieve the second type data.

12. The cross-platform multimedia interaction system of claim 11, wherein the first web browser module generates a first image according to the first type data and displays the first image on the display of the first electronic device, and the second web browser module generates a second image according to the second type data and displays the second image on the display of the second electronic device.

13. The cross-platform multimedia interaction system of claim 12, wherein the plurality of electronic devices further comprises a third electronic device, the third electronic device links to the multimedia server via the first web address to retrieve the first type data, and a third web browser module of the third electronic device generates the first image according to the first type data and displays the first image on the display of the third electronic device.

14. The cross-platform multimedia interaction system of claim 1, wherein at least a portion of parameters stored in the LRS are duplicated to one or more electronic devices in the plurality of electronic devices.

15. A multimedia generating method for use in a cross-platform multimedia interaction system comprising a central relay server (CRS), a plurality of electronic devices, and a plurality of displays respectively arranged on the plurality of electronic devices, the method comprising:
communicating the plurality of electronic devices with the CRS via internet;
utilizing the CRS to conduct an identity authentication on the plurality of electronic devices;
dynamically assigning one of the plurality of electronic devices as a local relay server (LRS);
instructing the LRS to activate a websocket server module;
utilizing the CRS to notify the other electronic devices of a network address of the LRS;
after the LRS activated the websocket server module, establishing one or more network sockets between other electronic devices of the plurality of electronic devices and the LRS;
utilizing the plurality of electronic devices to communicate control parameters via the websocket server module;
utilizing the plurality of electronic devices to generate corresponding images according to received control parameters; and
respectively displaying the generated images on the plurality of displays.

16. The method of claim 15, wherein the operation of utilizing the plurality of electronic devices to communicate control parameters via the websocket server module comprises:
utilizing a first electronic device of the plurality of electronic devices to transmit a first control parameter to a second electronic device of the plurality of electronic devices via the websocket server module to change images displayed on the display of the second electronic device; and
utilizing the second electronic device to transmit a second control parameter to the first electronic device via the websocket server module to change images displayed on the display of the first electronic device.

17. The method of claim 16, further comprising:
utilizing a first web browser module of the first electronic device to transmit the first control parameter and receive the second control parameter; and utilizing a second web browser module of the second electronic device to receive the first control parameter and transmit the second control parameter.

18. The method of claim 17, wherein
utilizing the first web browser module to transmit the first control parameter to the websocket server module;
utilizing the second web browser module to retrieve the first control parameter from the websocket server module using a polling method;
utilizing the second web browser module to transmit the second control parameter to the websocket server module; and
utilizing the first web browser module to retrieve the second control parameter from the websocket server module using a polling method.

19. The method of claim 18, further comprising:
terminating a session between the first electronic device and the CRS when the first electronic device completes a handshake procedure with the CRS.

20. The method of claim 19, further comprising:
utilizing the first electronic device to transmit an AJAX command to the CRS to terminate the session between the first electronic device and the CRS when the first electronic device completes a handshake procedure with the CRS.

21. The method of claim 19, further comprising:
utilizing the first web browser module to generate one or more images according to the second control parameter; and
displaying the one or more images on the display of the first electronic device.

22. The method of claim 21, further comprising:
utilizing the CRS to generate a first type data and a second type data;
utilizing the first electronic device to link to the CRS via a first web address to retrieve the first type data; and
utilizing the second electronic device to link to the CRS via a second web address to retrieve the second type data.

23. The method of claim 22, further comprising:
utilizing the first web browser module to generate a first image according to the first type data;
displaying the first image on the display of the first electronic device;
utilizing the second web browser module to generate a second image according to the second type data; and
displaying the second image on the display of the second electronic device.

24. The method of claim 23, further comprising:
utilizing a third electronic device of the plurality of electronic devices to link to the CRS via the first web address to retrieve the first type data;
utilizing a third web browser module of the third electronic device to generate the first image according to the first type data; and
displaying the first image on the display of the third electronic device.

25. The method of claim 15, further comprising:
duplicating at least a portion of parameters stored in the LRS to one or more electronic devices in the plurality of electronic devices.

* * * * *